(12) United States Patent
Otsuka et al.

(10) Patent No.: US 8,888,186 B2
(45) Date of Patent: Nov. 18, 2014

(54) VEHICLE SEAT

(71) Applicant: Toyota Boshoku Kabushiki Kaisha, Aichi-ken (JP)

(72) Inventors: Taiyo Otsuka, Toyota (JP); Tomoaki Isaji, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 93 days.

(21) Appl. No.: 13/711,929

(22) Filed: Dec. 12, 2012

(65) Prior Publication Data

US 2013/0161993 A1    Jun. 27, 2013

(30) Foreign Application Priority Data

Dec. 27, 2011   (JP) ................ 2011-285272

(51) Int. Cl.
  *B60N 2/02*   (2006.01)
  *B60N 2/20*   (2006.01)
  *B60N 2/44*   (2006.01)
  *B60N 2/30*   (2006.01)
  *B60N 2/22*   (2006.01)

(52) U.S. Cl.
  CPC  *B60N 2/442* (2013.01); *B60N 2/20* (2013.01); *B60N 2/3011* (2013.01); *B60N 2/3043* (2013.01); *B60N 2/22* (2013.01)
  USPC .................. 297/378.12; 297/378.1

(58) Field of Classification Search
  USPC .................. 297/378.1, 378.12, 380
  See application file for complete search history.

(56) References Cited

U.S. PATENT DOCUMENTS

| | | | | |
|---|---|---|---|---|
| 4,455,049 A | * | 6/1984 | Martin | 297/378.12 |
| 7,393,056 B2 | * | 7/2008 | O'Connor | 297/378.12 |
| 7,887,134 B2 | * | 2/2011 | Shao | 297/378.12 |
| 8,714,648 B2 | * | 5/2014 | Tanaka et al. | 297/378.1 |
| 2011/0095589 A1 | * | 4/2011 | Shao | 297/378.12 |
| 2011/0115274 A1 | * | 5/2011 | Hazlewood | 297/378.12 |

FOREIGN PATENT DOCUMENTS

| | | |
|---|---|---|
| JP | 2009-83603 | 4/2009 |
| JP | 2009-179091 | 8/2009 |
| JP | 2011-116303 | 6/2011 |

* cited by examiner

*Primary Examiner* — Sarah B McPartlin
(74) *Attorney, Agent, or Firm* — Greenblum & Bernstein, P.L.C.

(57) ABSTRACT

A vehicle seat including: a rotatable arm configured to release a holding state of a holding mechanism of a seat body; and an operating strap configured to rotate the arm by being pulled at a first end portion thereof, wherein a second end portion of the operating strap opposite to the first end portion is fixed to the seat body, a middle portion of the operating strap is folded back and is hanged to an engaging portion provided to the arm, and the arm is configured to be rotated by pulling the operating strap so as to pull in the engaging portion by the middle portion, and wherein the middle portion, which is folded back from the second end portion, is folded back from an outer side to an inner side with respect to a rotational center of the arm.

6 Claims, 6 Drawing Sheets

VEHICLE SEAT

CROSS-REFERENCE TO RELATED APPLICATIONS

This application claims priority from Japanese Patent Application No. 2011-285272 filed on Dec. 27, 2011, the entire contents of which are incorporated herein by reference.

TECHNICAL FIELD

The invention relates to a vehicle seat. More specifically, the invention relates to a vehicle seat including a rotatable arm configured to release a holding state of a holding mechanism which is configured to a seat body in a certain state and an operating strap having a flexible strip shape and is configured to rotate the arm in a direction of releasing operation by being pulled.

BACKGROUND

In a vehicle seat of related art, a configuration is known in which a lock state of a lock mechanism locking the seat body in a certain state is released by pulling an operating strap provided to a seat body (see, JP-A-2009-83603). Specifically, the operating strap is connected to a rotatable arm for releasing the lock mechanism, and the arm is rotated by pulling operation to release the lock mechanism. More specifically, an end portion of a part of the operating strap, which is opposite to an end thereof to be pulled, is fixed to the seat body, and a middle portion thereof is folded back and is hanged to an engaging portion provided to the arm. The arm is rotated by the pulling operation so as to pull in the engaging portion by the middle portion.

In JP-A-2009-83603, the middle portion, which is folded back from the end portion of the operating strap fixed to the seat body, is folded back from an inner side to an outer side with respect to a rotational center of the arm and is hanged to the engaging portion of the arm. For this reason, the end portion of the operating strap which is fixed to the seat body is arranged to easily interfere with the arm by the pulling operation of the operating strap. Thus, in the configuration disclosed in JP-A-2009-83603, as the length of the operating strap is extended, the end portion of the operating strap which is fixed is spaced apart from the arm, thereby avoiding the interference with the arm.

SUMMARY

The present invention has been made in view of the above-described matters, and an object of the present invention is to provide a layout capable of avoiding an operating strap from interfering with an arm, without extending a length of the operating strap.

According to an aspect of the present invention, there is provided a vehicle seat including: a rotatable arm configured to release a holding state of a holding mechanism which is configured to hold a seat body in a certain state; and an operating strap having a flexible strip shape and is configured to rotate the arm in a direction of releasing operation by being pulled at a first end portion thereof, wherein a second end portion of the operating strap, which is opposite to the first end portion, is fixed to the seat body, a middle portion of the operating strap is folded back and is hanged to an engaging portion which is provided to the arm, and the arm is configured to be rotated by pulling the operating strap so as to pull in the engaging portion by the middle portion, and wherein the middle portion, which is folded back from the second end portion fixed to the seat body to the first end portion, is folded back from an outer side to an inner side with respect to a rotational center of the arm so as to hang to the engaging portion.

According to another aspect of the present invention, there is provided a vehicle seat including: a seat body; a holding mechanism configured to hold the seat body; a rotatable arm configured to release a holding state of the holding mechanism; an engaging portion provided to the arm; and a strap configured to rotate the arm so as to release the holding state of the holding mechanism, the strap including, a first end portion, a second end portion which is provided at an opposite end of the first end portion and is fixed to the seat body, and a middle portion provided between the first end portion and the second end portion and contacting the engaging portion, wherein the strap is folded back at the middle portion, and wherein the first end portion is provided closer to a rotational center of the arm than the second end portion.

Accordingly, when the operating strap is pulled, the engaging portion of the arm to which the bent middle portion of the operating strap is hanged is pulled in, like a moving pulley, so that the arm is rotated in the direction of the releasing operation. In this instance, as compared to when an operating strap is directly connected to an arm to perform the pulling operation, a force required for the pulling operation of the operating strap is reduced. Although the pulling operation amount of the operating strap increases due to the decreased operating force, the pulling operating force of the operating strap can be reduce without extending a length of the arm. Since the middle portion, which is folded back from the end portion fixed to the seat body, is set to be folded back from the outer side to the inner side with respect to the rotational center of the arm so as to hang to the engaging portion, the end portion of the fixed side is positioned far from the arm in a diameter direction, so that it is arranged so as not to interfere with the arm. Accordingly, the vehicle seat can be arranged to prevent the interference between the operating strap and the arm.

DETAILED DESCRIPTION

Hereinafter, an exemplary embodiment for carrying out the present invention will be described with reference to the accompanying drawings.

First Exemplary Embodiment

Figure 1:
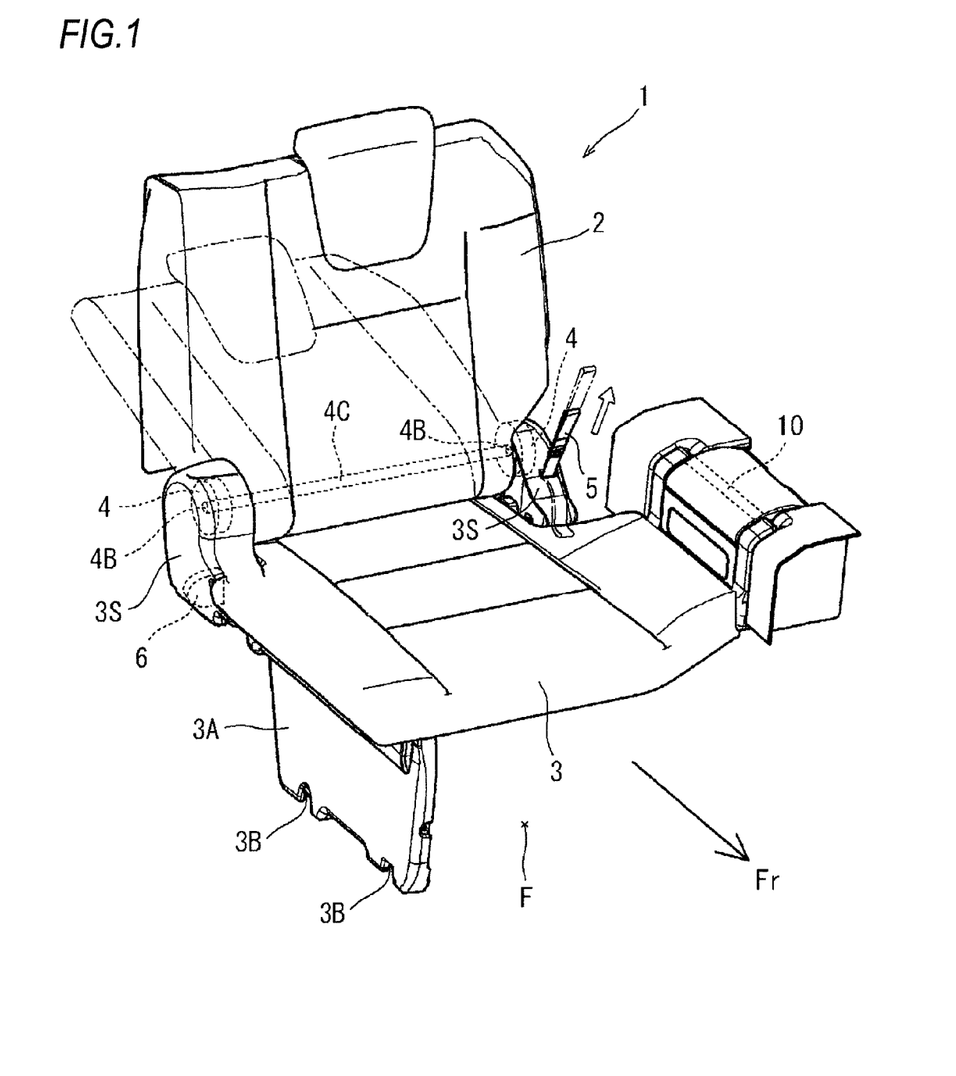
FIG. 1 is a perspective view schematically illustrating a configuration of a vehicle seat according to a first exemplary embodiment.
Figure 2:
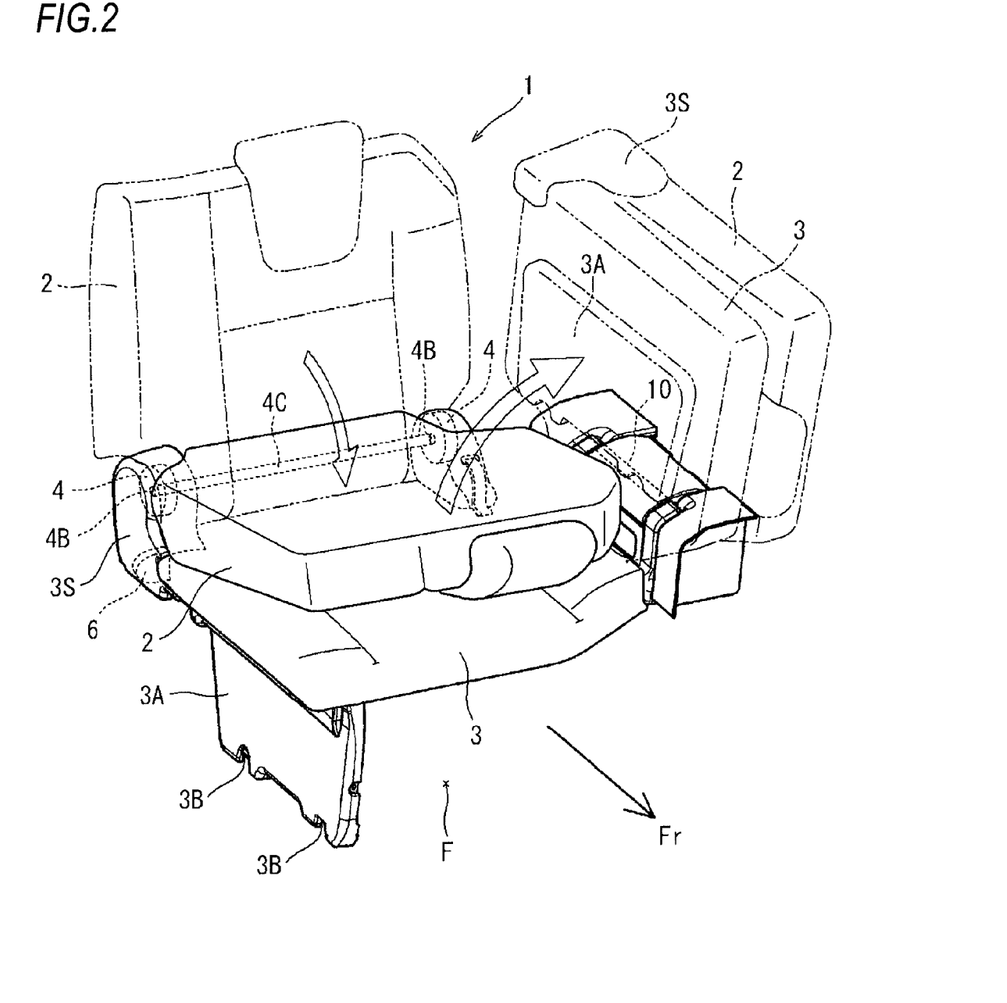
FIG. 2 is a perspective view illustrating a state in which the vehicle seat is flipped up in a lateral direction.

First, the configuration of a vehicle seat 1 according to the first exemplary embodiment will be described with reference to FIGS. 1 to 6. The vehicle seat 1 of this exemplary embodiment is configured to serve as a seat of the last row of a vehicle including three rows of seats, as illustrated in FIG. 1, and includes a seat back 2 serving as a backrest for a passenger, and a seat cushion 3 serving as a seating portion. In the vehicle seat 1, when a passenger seats on the seat, a fixing state of a backrest angle of the seat back 1 is released by obliquely pulling up an operating strap 5 of a flexible strip shape which is provided to a rear side portion of the seat cushion 3 at an outside (the right side of FIG. 1) of the vehicle, so that the backrest angle can be adjusted.

Specifically, the seat back 2 is normally biased in a forward tilting operation by a biasing force of a spring (not illustrated) which is disposed between the seat back 2 and the seat cushion 3. Therefore, when the lock condition of the backrest angle is released, the seat back 2 can be rotated forwardly by the biasing of the spring to a position where the seat back comes into contact with a back of the seating passenger. In conjunction with a tilting motion of the passenger to try to move his or her back rearward or frontward, a position of the backrest angle is adjusted. After the backrest angle is adjusted, the seat back 2 is locked at the adjusted backrest angle by stopping the pulling operation of the operating strap 5.

The vehicle seat 1 also includes a space-up mechanism capable of leaving a space widely on a floor F, in which if a release lever 6, which is provided to a rear lower portion at an inside (the left side of FIG. 1) of the vehicle is pulled forward, the seat back 2 is tilted forward and then is folded over a top surface of the seat cushion 3, and the whole folded vehicle seat 1 is flipped up toward a wall surface at the outside of the vehicle.

Specifically, as the release lever 6 is operated, the lock state of the backrest angle of the seat back 2 is released, and the seat back 2 is tilted forward by the biasing force of the above-described spring (not illustrated). Also, a lock state of each of a pair of front and rear lock devices 3B, which are provided to a bottom portion of a standing plate-shaped support plate 3A connected to the bottom portion of the seat cushion 3, is respectively released. Therefore, the vehicle seat 1 is flipped up in a lateral direction around a hinge coupling part 10 between the lateral portion of the seat cushion 3 at the outside of the vehicle with a slight force by a biasing force of a spring (not illustrated) provided to the hinge coupling part, to be stored. As the vehicle seat is flipped up in the lateral direction, the support plate 3A is folded over the bottom surface portion of the seat cushion 3, so that the vehicle seat 1 is folded compactly to the wall surface at the outside of the vehicle (stored state). Since the basic structure of the space-up mechanism of the vehicle seat 1 is substantially equal to that disclosed in literatures such as JP-A-2009-179091, the detailed description thereof will be omitted herein.

Figure 3:
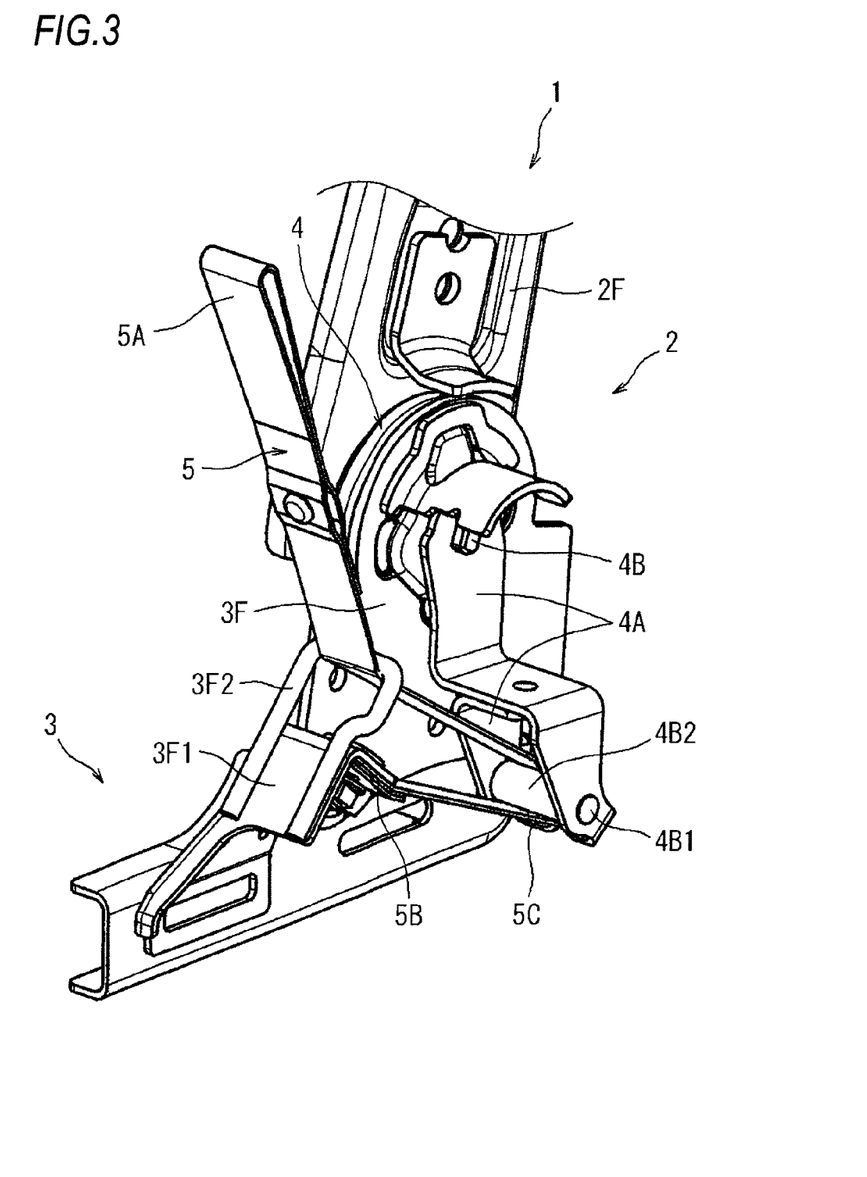
FIG. 3 is an enlarged perspective view of an operating mechanism of an operating strap.
Figure 4:
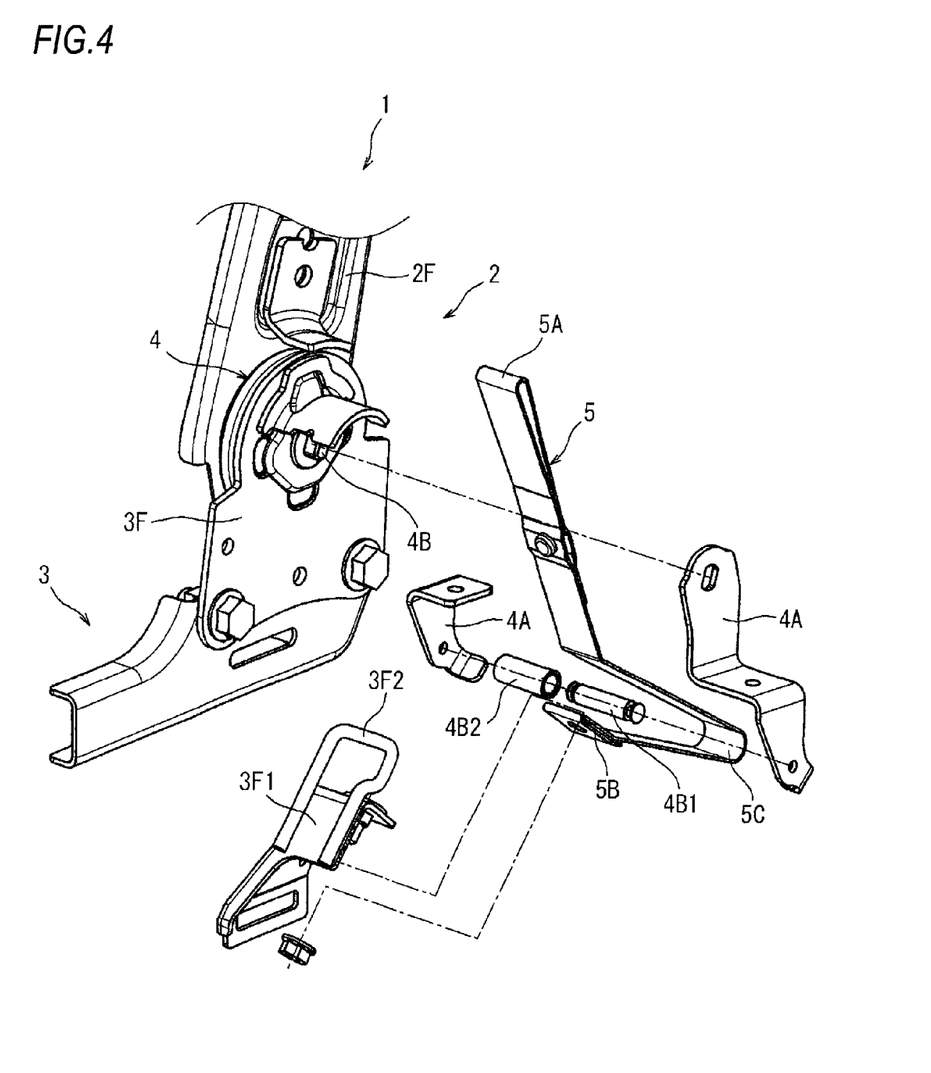
FIG. 4 is an exploded perspective view of the operating strap.

The configuration of each portion of the above-described vehicle seat 1 will be described in detail. As illustrated in FIGS. 1 and 3, the seat back 2 has lower end portions at both left and right sides thereof, and each end portion is connected to each other via a reclining device 4 which functions as a rotational shaft device capable of preventing rotation. Herein, each reclining device 4 corresponds to the "holding mechanism" of the present invention. Specifically, as illustrated in FIGS. 3 and 4, each reclining device 4 is provided between the lower end portions of both left and right sides of the seat back frame 2F formed in an inverted-U shape to form a frame of the seat back 2 and the rear end portions of both left and right sides of a seat cushion frame 3F formed in an inverted-shape, in a planar view, to form a frame of the seat cushion 3. These reclining devices are connected to each other in a relatively rotatable manner at a coaxial position through shaft connection. Each connecting structure of the seat back 2 and the seat cushion 3, which are connected to each other by the above-described respective reclining devices 4, is covered from its outside by shields 3S made of resin which are respectively mounted on both left and right side portions of the seat cushion 3, as illustrated in FIG. 1.

Each reclining device 4 is normally held so that the rotation of the seat back 2 is locked by a rotation prevention structure (lock structure) provided inside the reclining device 4. Therefore, the seat back 2 is normally held so that the backrest angle is locked. The lock state of each reclining device 4 is released by operating either of the operating strap 5 and the release lever 6 which is provided at the rear portions of both left and right sides of the above-described seat cushion 3.

Specifically, each of the above-described reclining devices 4 is mounted in such a way that an operation shaft 4B is axially inserted into center portions of each of the reclining devices 4, and each operation shaft 4B is able to release the lock state of the respective reclining devices 4 by rotation. Each rotation shaft 4B is connected to each other so that they are integrally rotated by a connecting rod 4C (see FIG. 1). Both the rotation shafts 4B are simultaneously rotated by operating either one of the operating strap 5 connected to the operation shaft 4B at the outside of the vehicle illustrated in FIG. 3, or the release lever 6 connected to the operation shaft 4B at the inside of the vehicle illustrated in FIG. 2, so that the lock states of each reclining device 4 are simultaneously released. The basic structure of each reclining device 4 is substantially equal to that disclosed in literatures such as JP-A-2011-116303, and thus, its detailed description will be omitted herein.

Figure 5:
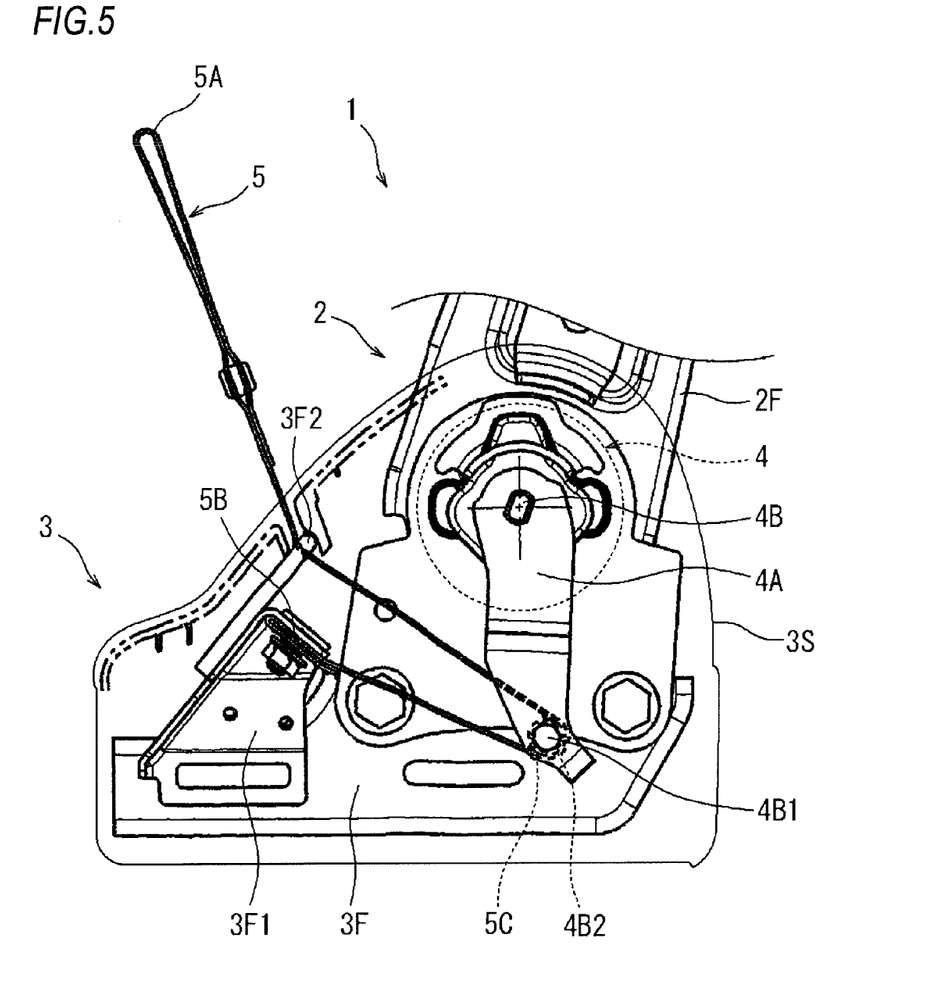
FIG. 5 is a side view of the operating mechanism of the operating strap.

Next, an operating structure of the operating strap 5 will be described. As illustrated in FIG. 1, the operating strap 5 is provided to extend upward from a slit formed on a top surface of the shield 3S which is made of resin and mounted on the side portion of the seat cushion 3 at the outside of the vehicle. Specifically, in the above-described shield 3S, the operating strap 5 has an end portion 5A at its front end, which extends outward and can be pulled, an end portion 5B opposite to the end portion 5A, which is fastened to a bracket 3F1 connected to the seat cushion frame 3F by a bolt, and a middle portion 5C, as illustrated in FIGS. 3 to 5. The middle portion 5C extends rearward from the end portion 5B and is folded back forwardly, thereby being hanged to a roller 4B2, which is attached to the front end portion of the arm 4A and integrally connected to the operation shaft 4B of the reclining device 4, from the rear side thereof. The middle portion 5C passes through the guide wire 3F2, which has the inverted U-shape and is connected to the bracket 3F1, from the lower side thereof to advance outwardly from the shield 3S. The seat cushion frame 2F corresponds to the "seat body" of the present invention, and the roller 4B2 corresponds to the "engaging portion" of the present invention.

The guide wire 3F2 is formed by bending a steel material of a round rod shape in an inverted-U shape, and the operating strap 5 passes below a horizontal rod portion functioning as a head portion of the guide wire 3F2. Therefore, even when the operating strap 5 is pulled upward, by sliding the operating strap 5 along the shape of the head portion, the guide wire 3F2 has a function of smoothly guiding the slide movement of the operating strap 5 so that the operating strap 5 is stretched forward, in the same manner as when the operating strap 5 is pulled forward.

Figure 6:
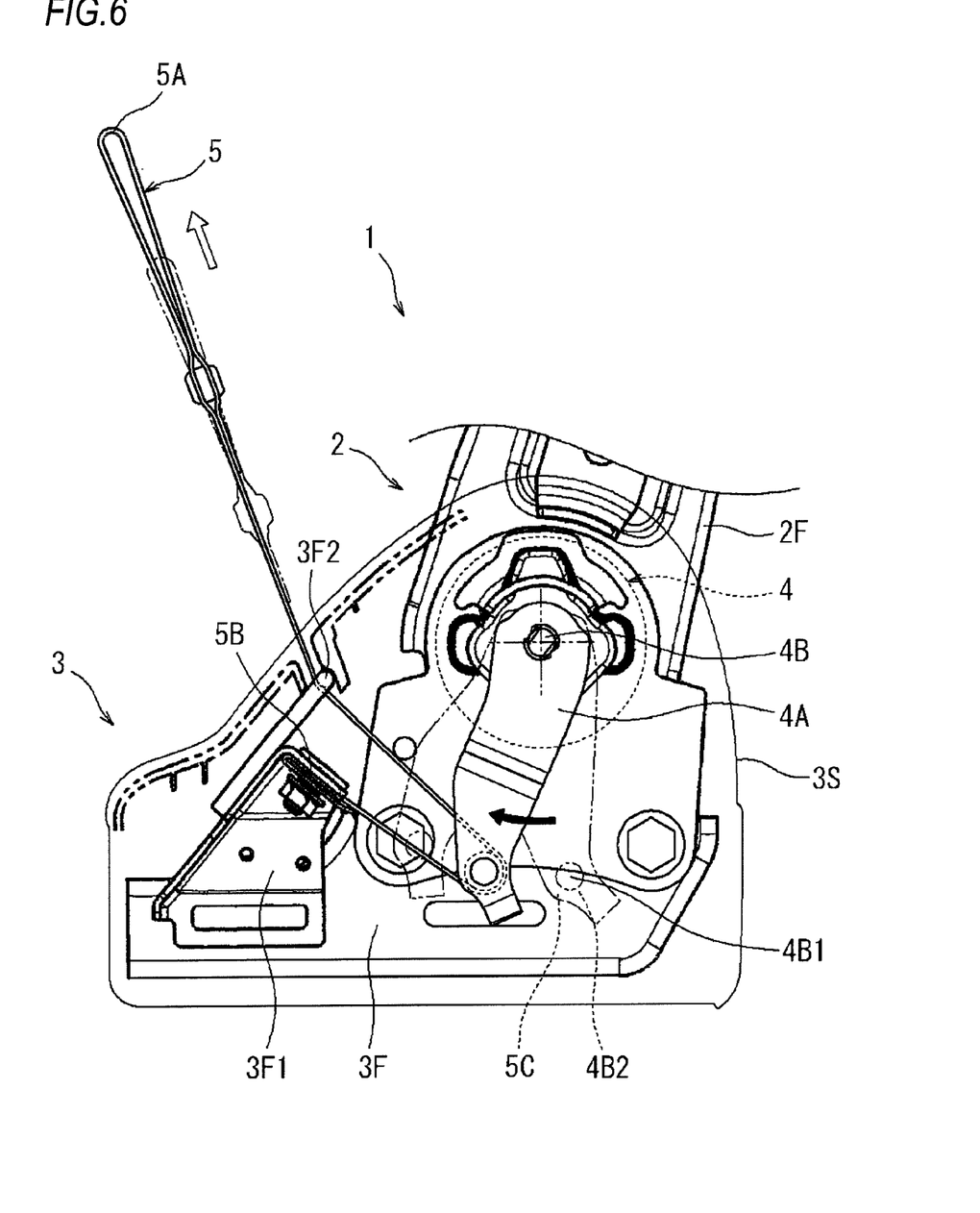
FIG. 6 is a side view illustrating a state in which the operating strap is pulled.

As illustrated in FIG. 6, as the end portion 5A at the front end side of the operating strap 5 which extends outward is pulled upward or forward, the roller 4B2 is pulled in forwardly by the middle portion 5C, in a state in which the fixed end portion 5B functions as a fulcrum point. The arm 4A is rotated forward, which is a direction of the release operation of the reclining device 4. The roller 4B2 is fitted into a shaft pin 4B1 connected to the lower portion of the arm 4A, as illustrated in FIGS. 3 and 4, in a state in which both ends of the shaft pin 4B1 are supported. The roller 4B2 is provided so as to be rotatable around the shaft pin 4B1. Therefore, when the operating strap 5 is pulled, the roller 4B2 is rotated along with the sliding of the operating strap 5, so that a frictional resistant force caused by the sliding is hardly generated between the roller 4B2 and the operating strap 5.

According to the configuration of the vehicle seat 1 according to this exemplary embodiment, the operating strap 5 is configured in such a way that the end portion 5B at the basis side is fixed to the bracket 3F1 (seat body), and the middle portion 5C is folded back around the roller 4B2 provided on the arm 4A. When the operating strap is pulled, the roller 4B2 is pulled in forwardly by the middle portion 5C, like a moving pulley, and the arm 4A is rotated. As compared to a mechanism of which the operating strap 5 is directly connected to the arm 4A to perform the pulling operation, it is possible to decrease the force required for the pulling operation of the operating strap 5. Although the pulling operation amount of the operating strap 5 is increased due to the decreased operating force, it is possible to reduce the pulling operating force of the operating strap 5 without extending the length of the arm 4A is not extended. Specifically, as illustrated in this exemplary embodiment, since the pulling operating force of the operating strap 5 can be reduced in the limited narrow space, like the vehicle seat 1, the releasing operation of the reclining device 4 can be conveniently and smoothly performed without extending the length of the arm 4A.

According to the operating strap 5, the middle portion 5C, which is folded back from the end portion 5B fixed to the seat cushion frame 3F, is folded back from the outer side to the inner side with respect to the rotational center (operation shaft 4B) of the arm 4A so as to be hanged to the engaging portion (roller 4B2). Since the end portion 5B of the fixed side is positioned far from the arm 4A in a diameter direction, it is arranged so as not to interfere with the arm 4A. Accordingly, the vehicle seat can be arranged to prevent the interference between the operating strap 5 and the arm 4A.

Although the exemplary embodiment of the present invention has been described, the present invention can be carried out as various aspects, in addition to the exemplary embodiment. For example, the operating target of the arm operated by the operating strap is not limited to the reclining device illustrated in the above exemplary embodiment. That is, various holding mechanisms for holding the seat body in any state, for example, various lock devices for locking any portion of the seat body to various fixing targets in a constant state, or various holding devices for holding an engaging state of any one portion of the seat body to any object, can be provided as the operating target of the arm. Also, the engaging portion of the arm, to which the folded back middle portion of the operating strap is hanged to, may not be a roller, but may be a pin of a round rod shape which cannot be rotated. However, it is preferred that the engaging portion has a round sliding surface so as not to inhibit the sliding of the operating strap.

The present invention provides illustrative, non-limiting aspects as follows:

(1) In a first aspect, there is provided a vehicle seat including: a rotatable arm configured to release a holding state of a holding mechanism which is configured to hold a seat body in a certain state; and an operating strap having a flexible strip shape and is configured to rotate the arm in a direction of releasing operation by being pulled at a first end portion thereof, wherein a second end portion of the operating strap, which is opposite to the first end portion, is fixed to the seat body, a middle portion of the operating strap is folded back and is hanged to an engaging portion which is provided to the arm, and the arm is configured to be rotated by pulling the operating strap so as to pull in the engaging portion by the middle portion, and wherein the middle portion, which is folded back from the second end portion fixed to the seat body to the first end portion, is folded back from an outer side to an inner side with respect to a rotational center of the arm so as to hang to the engaging portion.

According to the first aspect, when the operating strap is pulled, the engaging portion of the arm to which the bent middle portion of the operating strap is hanged is pulled in, like a moving pulley, so that the arm is rotated in the direction of the releasing operation. In this instance, as compared to when an operating strap is directly connected to an arm to perform the pulling operation, a force required for the pulling operation of the operating strap is reduced. Although the pulling operation amount of the operating strap increases due to the decreased operating force, the pulling operating force of the operating strap can be reduce without extending a length of the arm. Since the middle portion, which is folded back from the end portion fixed to the seat body, is set to be folded back from the outer side to the inner side with respect to the rotational center of the arm so as to hang to the engaging portion, the end portion of the fixed side is positioned far from the arm in a diameter direction, so that it is arranged so as not to interfere with the arm. Accordingly, the vehicle seat can be arranged to prevent the interference between the operating strap and the arm.

(2) In a second aspect, there is provided the vehicle seat according to the first aspect, wherein the holding mechanism includes a reclining device for locking a backrest angle of a seat back.

According to the second aspect, since the pulling operating force of the operating strap can be reduced without extending the length of the arm in a limited narrow space such as the vehicle seat, the releasing operation of the reclining device can be conveniently and smoothly performed.

(3) In a third aspect, there is provided the vehicle seat according to the first or second aspect, wherein the engaging portion provided to the arm includes a roller which is configured to rotate axially.

According to the third aspect, since the engaging portion includes a roller, the engaging portion can be more smoothly moved like a moving pulley, and a frictional resistant force generated between the roller and the operating strap is reduced, thereby further decreasing the pulling operating force of the operating strap.

(4) In a fourth aspect, there is provided a vehicle seat including: a seat body; a holding mechanism configured to hold the seat body; a rotatable arm configured to release a holding state of the holding mechanism; an engaging portion provided to the arm; and a strap configured to rotate the arm so as to release the holding state of the holding mechanism, the strap including, a first end portion, a second end portion which is provided at an opposite end of the first end portion and is fixed to the seat body, and a middle portion provided between the first end portion and the second end portion and contacting the engaging portion, wherein the strap is folded back at the middle portion, and wherein the first end portion is provided closer to a rotational center of the arm than the second end portion.

What is claimed is:

1. A vehicle seat comprising:
a rotatable arm configured to release a holding state of a holder which is configured to hold a seat body in a certain state;
an operating strap having a flexible strip shape and configured to rotate the arm in a direction of a releasing operation by being pulled at a first end portion thereof;
a bracket to which the operating strap is fixed; and
a guide wire connected to the bracket,
wherein a second end portion of the operating strap, which is opposite to the first end portion, is fixed to the seat body, a middle portion of the operating strap is folded back and is hanged to an engaging portion which is provided to the arm, and the arm is configured to be rotated by pulling the operating strap so as to pull in the engaging portion by the middle portion, and
wherein the middle portion, which is folded back from the second end portion fixed to the seat body to the first end portion, is folded back from an outer side to an inner side with respect to a distance from a rotational center of the arm so as to hang to the engaging portion,
wherein, when the operating strap is pulled, an inner surface of the operating strap slides along the guide wire.

2. The vehicle seat according to claim 1,
wherein the holder includes a recliner for locking a backrest angle of a seat back.

3. The vehicle seat according to claim 1,
wherein the engaging portion provided to the arm includes a roller which is configured to rotate axially.

4. A vehicle seat comprising:
a seat body;
a holder configured to hold the seat body;
a rotatable arm configured to release a holding state of the holder;
an engaging portion provided to the arm; and
a strap configured to rotate the arm so as to release the holding state of the holder, the strap including,
a first end portion,
a second end portion which is provided at an opposite end of the first end portion and is fixed to the seat body, and
a middle portion provided between the first end portion and the second end portion and contacting the engaging portion,
wherein the strap is folded back at the middle portion, and
wherein the first end portion is provided closer to a rotational center of the arm than the second end portion,
wherein the vehicle seat further comprises:
a bracket to which the strap is fixed; and
a guide wire connected to the bracket,
wherein, when the strap is pulled, an inner surface of the strap slides along the guide wire.

5. The vehicle seat according to claim 4,
wherein the holder includes a recliner for locking a backrest angle of a seat back.

6. The vehicle seat according to claim 4,
wherein the engaging portion provided to the arm includes a roller which is configured to rotate axially.

* * * * *